United States Patent [19]
Gavin et al.

[11] Patent Number: 5,342,437
[45] Date of Patent: Aug. 30, 1994

[54] GEL-FREE PAINT CONTAINING ZINC PYRITHIONE CUPROUS OXIDE AND CARBOXYLIC ACID

[75] Inventors: David F. Gavin; Rahim Hani, both of Cheshire; Craig Waldron, Waterbury; Douglas A. Farmer, Jr., Madison, all of Conn.

[73] Assignee: Olin Corporation, Cheshire, Conn.

[21] Appl. No.: 138,165

[22] Filed: Oct. 15, 1993

[51] Int. Cl.⁵ ................................ C09D 5/14
[52] U.S. Cl. ................ 106/18.33; 106/16; 106/18.34; 424/78.09; 504/152; 514/494; 514/499; 514/500; 514/345; 523/122
[58] Field of Search ........ 106/16, 18.33, 18.34; 424/78.09; 504/152; 514/494, 499, 500, 345; 523/122

[56] References Cited

U.S. PATENT DOCUMENTS

| | | | |
|---|---|---|---|
| 3,615,944 | 10/1971 | Yokoo et al. | 106/15.05 |
| 4,039,312 | 8/1977 | Patru | 106/16 |
| 4,581,351 | 4/1986 | Berke et al. | 514/345 |
| 4,918,147 | 4/1990 | Yamamori et al. | 424/78.09 |
| 5,057,153 | 10/1991 | Ruggiero | 106/18.33 |
| 5,098,473 | 3/1992 | Hani et al. | 106/18.33 |
| 5,112,397 | 5/1992 | Farmer, Jr. et al. | 106/18.33 |
| 5,137,569 | 8/1992 | Waldron et al. | 106/18.33 |
| 5,185,033 | 2/1993 | Hani et al. | 106/18.33 |
| 5,232,493 | 8/1993 | Waldron et al. | 106/18.33 |
| 5,238,490 | 8/1993 | Farmer, Jr. et al. | 106/18.33 |
| 5,246,489 | 9/1993 | Farmer, Jr. et al. | 106/18.33 |
| 5,252,123 | 10/1993 | Hani et al. | 106/18.33 |

FOREIGN PATENT DOCUMENTS

| | | |
|---|---|---|
| 0108634A1 | 6/1984 | European Pat. Off. |
| 0289481A2 | 11/1988 | European Pat. Off. |
| WO91/14743 | 3/1991 | PCT Int'l Appl. |

*Primary Examiner*—Anthony Green
*Attorney, Agent, or Firm*—Dale Lynn Carlson

[57] ABSTRACT

The present invention relates generally to paint and paint base and, more specifically, to a process and composition for providing a stable gel-free dispersion of zinc pyrithione plus cuprous oxide in paint. In accordance with the process of the present invention, the paint or paint base contains a carboxylic acid in order to impart desired gelation inhibition to the paint.

16 Claims, No Drawings

5,342,437

GEL-FREE PAINT CONTAINING ZINC PYRITHIONE CUPROUS OXIDE AND CARBOXYLIC ACID

FIELD OF THE INVENTION

This present invention relates generally to paints and paint bases and more specifically to a process for providing a stable gel-free dispersion of zinc pyrithione plus cuprous oxide biocide in paint.

BACKGROUND OF THE INVENTION

Combinations of zinc pyrithione and cuprous oxide are known to be excellent antifouling agents when formulated into paints and paint bases (i.e., the paint before pigment addition). Unfortunately, however, such paints have now been found to thicken or gel unacceptably within a few days at best, or a few hours, at worst, when formulated with typical commercial grades of zinc pyrithione in combination with cuprous oxide. Various solutions to the problem of gelation of paints containing zinc pyrithione in combination with cuprous oxide have been proposed. For example, U.S. Pat. No. 5,112,397 discloses a process for providing a gelation-inhibited paint which employs an organic amine and/or esterified wood rosin in order to impart the desired gelation-inhibition to the paint. Unfortunately, the organic amines are less desirable from an environmental standpoint than otherwise might be desired.

Accordingly, new, more environmentally friendly solutions to the above-discussed problem of unwanted gelation, with respect to paints containing zinc pyrithione in combination with cuprous oxide, would be highly desired by the paint manufacturing community, particularly since this combination of biocides provides excellent biocidal activity. The present invention provides one such solution.

SUMMARY OF THE INVENTION

In one aspect, the present invention relates to a process for providing a gelation-inhibited paint or paint base containing zinc pyrithione and cuprous oxide and characterized by enhanced biocidal efficacy which comprises the steps of:

(a) adding said zinc pyrithione and also adding cuprous oxide to a paint or paint base, said zinc pyrithione being present in an amount of between about 1% and about 25% (preferably 5-25%, more preferably 10-25%), and said cuprous oxide being present in an amount of between 20% and about 70%, the total amount of said pyrithione salt plus said cuprous oxide being between about 20% and about 80% (preferably 20-75%) based upon the total weight of the paint or paint base, (b) adding to said paint or paint base a carboxylic acid selected from the group consisting of oxalic acid and carboxylic acids of the formula (HOOC)$_n$-RCOOH, where n is 0 or 1 and R is $C_1$ to $C_{20}$ alkyl, alkenyl, alkynyl, cycloalkyl, cycloalkynyl, aryl (such as phenyl), aralkyl, and combinations thereof, said carboxylic acid being present in an amount of between about 0.3 and 15% by weight (preferably in an amount of between 1% and 15% by weight, more preferably in an amount at least equimolar relative to the amount of zinc pyrithione employed), based upon the total weight of the paint or paint base, and (c) adding a solution of an appropriate polymer resin and wood rosin in a suitable solvent or solvents, said wood rosin being present in an amount of between about 1% and 20% (preferably 2-15%, more preferably 10%), based upon the total weight of the paint or paint base.

In another aspect, the present invention relates to the above process wherein the steps (a) and (b) are conducted stepwise or simultaneously to provide the desired paint or paint base stabilized against gelation.

In yet another aspect, the present invention relates to a paint or paint base composition characterized by enhanced biocidal efficacy and gelation resistance wherein the paint or paint base contains a biocide comprising (and advantageously consisting essentially of) cuprous oxide and zinc pyrithione and wherein the paint or paint base is stabilized against gelation by virtue of the presence therein of the above described acid compound or wood rosin.

These and other aspects of the invention will become apparent upon reading the following detailed description of the invention.

DETAILED DESCRIPTION OF THE INVENTION

It has now been surprisingly found in accordance with the present invention, that the incorporation into a zinc pyrithione and cuprous oxide containing paint of a carboxylic acid within the above-described empirical structural formula reduces the tendency of the paint to gel relative to a comparative paint without the carboxylic acid. This finding will be of great significance to the paint producers in view of the low toxicity and corrosivity of the carboxylic acids, as well as their relative cheapness.

Without wishing to be bound by any particular theory, it is believed that the gelation problem associated with paints containing zinc pyrithione plus cuprous oxide is attributable, at least in part, to the presence of carboxylic acid groups on the wood rosin or polymer employed in typical paint formulations. Assuming that this theory is correct, it is then all the more surprising that a solution to the unwanted gelation problem is provided in accordance with the present invention by incorporating carboxylic acid moieties into the paint formulation.

Preferred carboxylic acids within the above-identified structural formula are those wherein R contains between 3 and 10 carbon atoms. Specific examples of advantageous carboxylic acids are provided in the working examples given hereinbelow. A particularly preferred carboxylic acid is naphthenic acid which typically comprises a mixture of alkyl derivatives of cyclopentane and cyclohexane carboxylic acids and/or related derivatives. A less preferred acid among the working examples provided hereinbelow is glutaconic acid. Abiatic, acetic and formic acids are not useful within, and are outside, the scope of the present invention.

Although the improved biocidal efficacy and gelation resistance advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides desirable results in the context of exterior paints of the latex and alkyd types.

Typically a paint composition will contain a resin, a pigment, and various optional additives such as thickening agent(s), wetting agents and the like, as is well known in the art. The resin is preferably selected from the group consisting of vinyl, alkyd, epoxy, acrylic, polyurethane and polyester resins, and combinations of thereof. The resin is preferably employed in an amount of between about 20% and about 80% based upon the weight of the paint or paint base.

In addition, the paint composition of the present invention optionally additionally contains optional additives which have a favorable influence on the viscosity, the wetting power and the dispersibility, as well as on the stability to freezing and electrolytes and on the foaming properties. If a marine paint is being fabricated, the paint preferably contains a swelling agent to cause the paint to gradually "slough off" in its marine environment, thereby causing renewed biocidal efficacy of newly exposed biocide (i.e., the pyrithione salt plus the copper salt) at the surface of the paint in contact with the water medium of the marine environment. Illustrative swelling agents are naturally occurring or synthetic clays, such as kaolin, montomorillonite bentonitic), clay mica (muscovite), and chlorite (hectonite), and the like. In addition to clays other swelling agents, including natural or synthetic polymers, such as that commercially available as POLYMERGEL, have been found to be useful in the compositions of the present invention to provide the desired "sloughing off" effect. Swelling agents can be used singly or in combination. The total amount of optional additives is preferably no greater than 20% by weight, more preferably between about 1% and about 5% by weight, based upon the total weight of the paint composition.

Illustrative, thickening agents include cellulose 30 derivatives, for example methyl, hydroxyethyl, hydroxypropyl and carboxymethyl cellulose, poly(vinyl alcohol), poly (vinylpyrolidone), poly(ethyleneglycol), salts of poly(acrylic acid) and salts of acrylic acid/acrylamide copolymers.

Suitable wetting and dispersing agents include sodium polyphosphate, salts of flow molecular weight poly(acrylic acid), salts of poly(ethane sulfonic acid), salts of poly (vinyl phosphonoc acid), salts of poly(maleic acid) and salts of copolymers of maleic acid with ethylene, 1 olefins 3 to 18 carbon atoms and/or styrene.

In order to increase the stability to freezing and electrolytes there may be added to the paint composition various monomer 1.2-diols for example glycol, propylene glycol (1.2) and butylene glycol 1.2) or polymers thereof, or ethoxylated compounds. For example reaction products of ethylene oxide with long-chain alkanols, amines, carboxylic acids, carboxylic acid amides, alkyd phenols, poly(propyleneglycol) or poly(butylene glycol).

The minimum temperature of film formation (white point) of the paint composition may be reduced by adding solvents, such as ethylene glycol, butyl glycol, ethyl glycol acetate, ethyl diglycol acetate, butyl diglycol acetate, benzene or alkylated aromatic hydrocarbons. As defoaming agents there are suitable for example poly(propylene glycol) and polysiloxanes. Optionally other biocides can be incorporated in the paint formulations of the present invention in addition to the zinc pyrithione and cuprous oxide. Useful optional solvents include methylisobutylketone (herein referred to as "MIBK"), xylene, ethyl benzene, methanol, and combinations thereof.

The paint composition of the present invention may be used as a paint for natural or synthetic materials, for example wood, paper, metals, textiles and plastics. It is particularly suitable as an outdoor paint, and is excellent for use as a marine paint.

The invention is further illustrated by the following Examples. Unless otherwise stated, the "parts" and "%" are "parts by weight" and "percent by weight", respectively.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

COMPARATIVE EXAMPLE A

Demonstration of gelation results in a paint containing cuprous oxide plus zinc pyrithione.

A paint was prepared using the following formulation:

| INGREDIENT | WEIGHT IN GRAMS | PERCENT |
|---|---|---|
| VAGH resin* | 3.90 | 2.89 |
| CUPROUS OXIDE | 75.00 | 55.51 |
| Zinc pyrithione powder | 6.20 | 4.59 |
| TRICRESYL PHOSPHATE | 3.60 | 2.66 |
| WOOD ROSIN | 5.00 | 3.70 |
| SOLVENT MIXTURE** | 38.00 | 28.13 |
| TOTAL | 135.10 | 100.00 |

*Vinyl chloride-vinyl acetate-vinyl alcohol terpolymer, a product of Union Carbide Corp.
**The solvent mixture used was a 40:60 mixture of xylene and MIBK (called mixed solvent).

The zinc pyrithione used was standard commercial grade and assayed 97.8% pure by iodometric titration.

The procedure employed for preparing the paint was as follows:

1) A half pint paint can was charged with 17.57 g of a 22.2% VAGH resin solution in a 60:40 mixture by weight of MIBK and xylene.
2) Tributyl phosphate was added the paint can and mixed with a high speed dispenser at 1000 RPM for 10 minutes.
3) The cuprous oxide, zinc pyrithione and 5.4 g of mixed solvent were added to the paint can and mixing was continued at 5000 RPM for 1 hr.
4) The mixing speed was reduced to 2500 RPM and 9.8 g of mixed solvent was added.
5) The sample temperature was kept below 50° C. using a water bath.
6) Ten grams of 50% (wt) wood rosin in mixed solvent was added to the can and the mixture was mixed for 5 minutes at 2000 RPM.
7) The solvent mixture which was lost during workup was added back to the paint and mixed for 5 minutes.

The paint formulation made according to this procedure was of suitable viscosity for application by brush immediately after preparation, but thickened to an unpourable paste after approximately 6 hours.

EXAMPLE 1

This example illustrates the effectiveness of employing a carboxylic acid in accordance with the present invention to stabilize a paint formulation containing zinc pyrithione and cuprous oxide against gelation. Twelve paint formulations (Formulations 1 through 12) were made using the procedure given below, and each of these formulations was observed visually for stability against gelation by noting the lack of gels of "clumping" of each paint formulation.

Each formulation is identified in the tables provided below the procedure.

Procedure for Making the Paints of Formulations 1–12 Below

Pre-treatment of Pigments:

(1) A half-pint paint can was charged with the total amounts shown in the formulation table of Zinc OMADINE, cuprous oxide, tricresyl phosphate plus the selected amount of acid and 8.0 g mixed solvent. The above materials were mixed with a high speed dispenser at 2500 RPM until the contents became very thick. Depending on the acid selected this occurred usually by 30 minutes. The sample was then allowed to set for one hour.

Pigment Grind:

(2) Next 17.7 g of a 22.2% VAGH resin in a 60:40 mixture by weight of MIBK xylene, and 7.2 g of solvent was added to the above mix. This was agitated for 15 seconds then placed back on the high speed and mixed for 30 minutes at 3000 RPM.

(3) The sample temperature was kept below 50° C. using a water bath.

Letdown Stage:

(4) Ten grams of 50% (Wt.) wood rosin in mixed solvent was added to the can and the mixture was mixed for 5 minutes at 2000 RPM.

(5) The solvent mixture which was lost during workup was added back to the paint and mixed for 2 minutes. Solvent mixture used was a 40% mixture of xylene and 60% MIBK.

FORMULATION 1

Cuprous Oxide and Zinc Pyrithione With Naphthenic Acid

| Ingredient | Weight In Grams | Percent |
| --- | --- | --- |
| NAPHTHENIC ACID | 3.40 | 2.52 |
| VAGH | 3.90 | 2.89 |
| CUPROUS OXIDE | 75.00 | 55.51 |
| ZINC PYRITHIONE POWDER | 6.20 | 4.59 |
| TRICRESYL PHOSPHATE | 3.60 | 2.66 |
| WOOD ROSIN | 5.00 | 3.70 |
| SOLVENT MIXTURE* | 38.00 | 28.13 |
| TOTAL: | 135.10 | 100.00 |

*60% MIBK/40% XYLENE

FORMULATION 2

Cuprous Oxide and Zinc Pyrithione With Naphthenic Acid

| Ingredient | Weight In Grams | Percent |
| --- | --- | --- |
| ACRYLOID B48NID* | 3.90 | 2.88 |
| NAPHTHENIC ACID | 3.70 | 2.73 |
| CUPROUS OXIDE | 75.00 | 55.39 |
| ZINC PYRITHIONE POWDER | 6.20 | 4.58 |
| TRICRESYL PHOSPHATE | 3.60 | 2.66 |
| WOOD ROSIN | 5.00 | 3.69 |
| SOLVENT MIXTURE** | 38.00 | 28.06 |
| TOTAL: | 135.40 | 100.00 |

*ACRYLOID B48M is an acrylic acid/methyl methacrylate copolymer product of Rohm & Haas Company.
**60% MIBK/40% XYLENE

FORMULATION 3

Cuprous Oxide and Zinc Pyrithione With Stearic Acid

| Ingredient | Weight In Grams | Percent |
| --- | --- | --- |
| STEARIC ACID | 5.70 | 4.15 |
| VAGH | 3.90 | 2.84 |
| CUPROUS OXIDE | 75.00 | 54.59 |
| ZINC PYRITHIONE POWDER | 6.20 | 4.51 |
| TRICRESYL PHOSPHATE | 3.60 | 2.62 |
| WOOD ROSIN | 5.00 | 3.64 |
| SOLVENT MIXTURE* | 38.00 | 27.66 |
| TOTAL: | 137.40 | 100.00 |

*60% MIBK/40% XYLENE

FORMULATION 4

Cuprous Oxide and Zinc Pyrithione With Hexanoic Acid

| Ingredient | Weight In Grams | Percent |
| --- | --- | --- |
| HEXANOIC ACID | 2.27 | 1.69 |
| VAGH | 3.90 | 2.91 |
| CUPROUS OXIDE | 75.00 | 55.98 |
| ZINC PYRITHIONE POWDER | 6.20 | 4.63 |
| TRICRESYL PHOSPHATE | 3.60 | 2.69 |
| WOOD ROSIN | 5.00 | 3.73 |
| SOLVENT MIXTURE* | 38.00 | 28.36 |
| TOTAL: | 137.40 | 100.00 |

*60% MIBK/40% XYLENE

FORMULATION 5

Cuprous Oxide and Zinc Pyrithione With Benzoic Acid

| Ingredient | Weight In Grams | Percent |
| --- | --- | --- |
| BENZOIC ACID | 2.39 | 1.78 |
| VAGH | 3.90 | 2.91 |
| CUPROUS OXIDE | 75.00 | 55.93 |
| ZINC PYRITHIONE POWDER | 6.20 | 4.62 |
| TRICRESYL PHOSPHATE | 3.60 | 2.68 |
| WOOD ROSIN | 5.00 | 3.73 |
| SOLVENT MIXTURE* | 38.00 | 28.34 |
| TOTAL: | 134.09 | 100.00 |

*60% MIBK/40% XYLENE

FORMULATION 6

Cuprous Oxide and Zinc Pyrithione With Linoleic Acid

| Ingredient | Weight In Grams | Percent |
| --- | --- | --- |
| LINOLEIC ACID | 5.49 | 4.00 |

-continued

| Ingredient | Weight In Grams | Percent |
|---|---|---|
| VAGH | 3.90 | 2.84 |
| CUPROUS OXIDE | 75.00 | 54.67 |
| ZINC PYRITHIONE POWDER | 3.20 | 4.52 |
| TRICRESYL PHOSPHATE | 3.60 | 2.62 |
| WOOD ROSIN | 5.00 | 3.64 |
| SOLVENT MIXTURE* | 38.00 | 27.70 |
| TOTAL: | 137.19 | 100.00 |

*60% MIBK/40% XYLENE

FORMULATION 7

Cuprous Oxide and Zinc Pyrithione With Glutaconic Acid

| Ingredient | Weight In Grams | Percent |
|---|---|---|
| GLUTACONIC ACID | 1.30 | 0.98 |
| VAGH | 3.90 | 2.93 |
| CUPROUS OXIDE | 75.00 | 56.39 |
| ZINC PYRITHIONE POWDER | 6.20 | 4.66 |
| TRICRESYL PHOSPHATE | 3.60 | 2.71 |
| WOOD ROSIN | 5.00 | 3.76 |
| SOLVENT MIXTURE* | 38.00 | 28.57 |
| TOTAL: | 133.00 | 100.00 |

*60% MIBK/40% XYLENE

FORMULATION 8

Cuprous Oxide and Zinc Pyrithione With Propionic Acid

| Ingredient | Weight In Grams | Percent |
|---|---|---|
| PROPIONIC ACID | 1.44 | 1.08 |
| VAGH | 3.90 | 2.93 |
| CUPROUS OXIDE | 75.00 | 56.33 |
| ZINC PYRITHIONE POWDER | 6.20 | 4.66 |
| TRICRESYL PHOSPHATE | 3.60 | 2.70 |
| WOOD ROSIN | 5.00 | 3.76 |
| SOLVENT MIXTURE* | 38.00 | 28.54 |
| TOTAL: | 133.14 | 100.00 |

*60% MIBK/40% XYLENE

FORMULATION 9

Cuprous Oxide and Zinc Pyrithione With 2-methylpropionic Acid

| Ingredient | Weight In Grams | Percent |
|---|---|---|
| 2-METHYLPROPIONIC ACID | 1.72 | 1.29 |
| VAGH | 3.90 | 2.92 |
| CUPROUS OXIDE | 75.00 | 56.21 |
| ZINC PYRITHIONE POWDER | 6.20 | 4.65 |
| TRICRESYL PHOSPHATE | 3.60 | 2.70 |
| WOOD ROSIN | 5.00 | 3.75 |
| SOLVENT MIXTURE* | 38.00 | 28.48 |
| TOTAL: | 133.42 | 100.00 |

*60% MIBK/40% XYLENE

FORMULATION 10

Cuprous Oxide and Zinc Pyrithione With Trimethylacetic Acid

| Ingredient | Weight In Grams | Percent |
|---|---|---|
| TRIMETHYLACETIC ACID | 1.99 | 1.49 |
| VAGH | 3.90 | 2.92 |
| CUPROUS OXIDE | 75.00 | 56.10 |
| ZINC PYRITHIONE POWDER | 6.20 | 4.64 |
| TRICRESYL PHOSPHATE | 3.60 | 2.69 |
| WOOD ROSIN | 5.00 | 3.74 |
| SOLVENT MIXTURE* | 38.00 | 28.42 |
| TOTAL: | 133.69 | 100.00 |

*60% MIBK/40% XYLENE

FORMULATION 11

Cuprous Oxide and Zinc Pyrithione With 1-methyl-1-cyclohexane Carboxylic Acid (MCCA)

| Ingredient | Weight In Grams | Percent |
|---|---|---|
| MCCA | 2.78 | 2.07 |
| VAGH | | |
| CUPROUS OXIDE | 75.00 | 55.77 |
| ZINC PYRITHIONE POWDER | 6.20 | 4.61 |
| TRICRESYL PHOSPHATE | 3.60 | 2.68 |
| WOOD ROSIN | 5.00 | 3.72 |
| SOLVENT MIXTURE* | 38.00 | 28.26 |
| TOTAL: | 134.48 | 100.00 |

*60% MIBK/40% XYLENE

FORMULATION 12

Cuprous Oxide and Zinc Pyrithione With Naphthenic Acid

| Ingredient | Weight In Grams | Percent |
|---|---|---|
| ACRYLOID B48N* | 3.90 | 2.88 |
| NAPHTHENIC ACID | 3.70 | 2.73 |
| CUPROUS OXIDE | 80.00 | 59.08 |
| ZINC PYRITHIONE POWDER | 6.20 | 4.58 |
| TRICRESYL PHOSPHATE | 3.60 | 2.66 |
| SOLVENT MIXTURE** | 38.00 | 28.06 |
| TOTAL: | 135.40 | 100.00 |

*ACRYLOID B48M is an acrylic acid/methyl methacrylate copolymer product of Rohm & Haas Company.
**60% MIBK/40% XYLENE All of the paint formulations identified as Formulations 1 through 12 provided paints that were observed to be stable for at least eight weeks and continuing, and have suitable viscosity to application by brush, except the paint of example 7, which showed stability against gelation for one week.

Having thus described the invention what is claimed is:

1. A paint or paint base composition characterized by enhanced biocidal efficacy and gelation resistance wherein the paint or paint base contains wood rosin and a biocide comprising cuprous oxide and zinc pyrithione, and the paint or paint base further comprises a carboxylic acid selected from the group consisting of oxalic acid and carboxylic acids of the formula $(HOOC)_n$-RCOOH where n is 0 or 1 and R is $C_1$ to $C_{20}$ alkyl, alkenyl, alkynyl, cycloalkyl, cycloalkenyl, cycloalkynyl, aryl, aralkyl, and combinations thereof, and said zinc pyrithione being present in an amount of between about 1% and about 25% and said cuprous oxide being present in an amount of between about 20% and about 70%, the total amount of said zinc pyrithione plus said cuprous oxide being between about 20% and about 80% based upon the total weight of the paint or paint base, said carboxylic acid being present in an amount of between 0.3 to 15% based upon the total weight of the paint or paint base composition and said wood rosin being present in an amount of between about 1% and 20% based upon the total weight of the paint or paint base.

2. The paint or paint base of claim 1 wherein the total amount of said cuprous oxide and zinc pyrithione is between about 20% and about 75% based upon the total weight of the paint or paint base composition.

3. The paint or paint base of claim 1 wherein the amount of said carboxylic acid is between about 1% and 15% based upon the total weight of the paint or paint base composition with the proviso that the amount of said carboxylic acid is at least equivalent to the amount of said zinc pyrithione employed.

4. The paint or paint base of claim 1 wherein the paint or paint base additionally contains wood rosin in an amount of between about 2% and 15% based upon the total weight of the paint or paint base composition, and wherein said wood rosin is selected from the group consisting of esterified wood rosin, ester-free wood rosin, and combinations thereof.

5. The paint or paint base of claim 1 which additionally contains a resin selected from the group consisting of vinyl, alkyd, epoxy, acrylic, polyurethane and polyester resins, and combinations thereof.

6. The paint or paint base of claim 1 which additionally contains a swelling agent selected from the group consisting of natural and synthetic clay and natural and synthetic polymer swelling agents.

7. The paint or paint base of claim 1 wherein said carboxylic acid is naphthenic acid.

8. A process for providing a gelation-inhibited paint or paint base characterized by enhanced biocidal efficacy and containing zinc pyrithione and cuprous oxide which comprises the steps of:
 (a) adding said zinc pyrithione and also adding cuprous oxide to a paint or paint base to provide a paint or paint base, said zinc pyrithione being present in an amount of between about 1% and about 25%, and said cuprous oxide being present in an amount of between about 20% and about 70%, the total amount of said cuprous oxide and zinc pyrithione oxide being between about 20% and about 80% based upon the total weight of the paint or paint base,
 (b) adding to said paint or paint base a carboxylic acid selected from the group consisting of oxalic acid and carboxylic acids of the formula $(HOOC)_n$-RCOOH where n is 0 or 1 and R is $C_1$ to $C_{20}$ alkyl, alkenyl, alkynyl, cycloalkyl, cycloalkenyl, cycloalkynyl, aryl aralkyl, and combinations thereof, said carboxylic acid being present in an amount of between about 0.3% and 15%, based upon the total weight of the paint or paint base, and
 (c) adding wood rosin or esterified wood rosin esterified by an alcohol of the formula $(HO)_y R_2 OH$, where y is 0 or 1 and $R_2$ is $C_1$ to $C_{10}$ alkyl, alkenyl, alkynyl, cycloalkyl, or cycloalkynyl, said wood rosin or esterified wood rosin being present in an amount of between about 1% and 20%, based upon the total weight of the paint or paint base.

9. The process of claim 8 wherein the total amount of said cuprous oxide and zinc pyrithione is between about 20% and about 75% based upon the total weight of the paint or paint base composition.

10. The process of claim 8 wherein the total amount of said carboxylic acid is between about 1% and 15% based upon the total weight of the paint or paint base composition with the proviso that the amount of said carboxylic acid is equivalent to the amount of said zinc pyrithione employed.

11. The process of claim 8 wherein the total amount of said wood rosin or esterified wood rosin is between about 2% and 15% based upon the total weight of the paint or paint base composition.

12. The process of claim 8 wherein said composition additionally contains a resin selected from the group consisting of vinyl, alkyd, epoxy, acrylic, polyurethane and polyester resins, and combinations thereof, said resin being added after step (b) of claim 7.

13. The process of claim 8 wherein said composition additionally contains a swelling agent selected from the group consisting of natural and synthetic clay and natural and synthetic polymer swelling agents.

14. The process of claim 8 wherein steps (a) and (b) are carried out simultaneously.

15. The process of claim 13 wherein said swelling agent is selected from the group consisting of kaolin, montomorillonite (bentonite), clay mica (muscovite), and chlorite (hectonite) and combinations thereof.

16. The process of claim 8 wherein said carboxylic acid is naphthenic acid.

* * * * *